United States Patent
Eickemeyer et al.

(10) Patent No.: US 9,524,166 B2
(45) Date of Patent: Dec. 20, 2016

(54) TRACKING LONG GHV IN HIGH PERFORMANCE OUT-OF-ORDER SUPERSCALAR PROCESSORS

(71) Applicant: International Business Machines Corporation, Armonk, NY (US)

(72) Inventors: Richard J. Eickemeyer, Rochester, MN (US); Tejas Karkhanis, White Plains, NY (US); Brian R. Konigsburg, Austin, TX (US); David S. Levitan, Austin, TX (US); Douglas R. G. Logan, Austin, TX (US); Jose E. Moreira, Irvington, NY (US); Mauricio J. Serrano, Bronx, NY (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 699 days.

(21) Appl. No.: 13/948,800

(22) Filed: Jul. 23, 2013

(65) Prior Publication Data
US 2015/0032997 A1  Jan. 29, 2015

(51) Int. Cl.
*G06F 9/00* (2006.01)
*G06F 9/30* (2006.01)
*G06F 9/38* (2006.01)
*G06F 11/34* (2006.01)

(52) U.S. Cl.
CPC ......... *G06F 9/30058* (2013.01); *G06F 9/3844* (2013.01); *G06F 11/3466* (2013.01)

(58) Field of Classification Search
CPC ........................... G06F 9/3844; G06F 11/3466
See application file for complete search history.

(56) References Cited

U.S. PATENT DOCUMENTS

| | | | |
|---|---|---|---|
| 5,732,253 A | 3/1998 | McMahon | |
| 6,745,323 B1 | 6/2004 | Sinharoy et al. | |
| 6,976,157 B1 | 12/2005 | Sinharoy et al. | |
| 7,689,816 B2 | 3/2010 | Levitan | |
| 2002/0194465 A1* | 12/2002 | Sinharoy | G06F 9/3844 712/239 |

* cited by examiner

*Primary Examiner* — Zachary K Huson
(74) *Attorney, Agent, or Firm* — Scully, Scott, Murphy & Presser, P.C.

(57) ABSTRACT

Tracking global history vector in high performance out of order superscalar processors, in one aspect, may comprise providing a shift register storing global history vector that stores branch predictions and outcomes. A counter is maintained to determine a number of bits to shift the shift register to recover branch history. In another aspect, the global history vector may be implemented with a circular buffer structure. Youngest and oldest pointers to the circular buffer are maintained and used in recovery.

17 Claims, 9 Drawing Sheets

TRACKING LONG GHV IN HIGH PERFORMANCE OUT-OF-ORDER SUPERSCALAR PROCESSORS

FIELD

The present application relates generally to computer processor architecture, and more particularly to performing branch prediction with long global branch history vector.

BACKGROUND

Branch prediction significantly improves performance in a processor. Thus, processors have added tables for branch prediction in different forms. These tables are accessed simultaneously, and a decision is made to select the table which will give the best decision for a particular branch.

A state-of-art of conditional branch prediction is the TAGE predictor. TAGE stands for Tagged Geometric history length predictor. It relies on a combination of tagged predictor components indexed using different lengths for index computation. These history lengths form a geometric series. Each table is indexed by a combination of the program address and a particular history length.

The present disclosure addresses in one aspect, managing global history vectors, for example, for branch predictions.

BRIEF SUMMARY

A method of tracking global history vector in high performance processors, in one aspect, may comprise receiving a fetch group comprising a group of instructions for execution on a processor. The method may also comprise tagging the fetch group with a current shift count of a global history vector comprising a plurality of bits implemented with a shift register. The method may also comprise receiving branch prediction associated with the fetch group, predicted using at least the global history vector. The method may also comprise shifting the global history vector by a number of bits to a direction of older bit position. The method may also comprise storing the branch prediction associated with the fetch group in most recent bit position of the global history vector. The method may also comprise updating the current shift count of the global history vector based on the number of bits. The global history vector, in one aspect, represents an execution path. Each of the plurality of bits may be allocated for a corresponding fetch group.

A method of tracking global history vector in high performance processors, another aspect, may comprise receiving a fetch group comprising a group of instructions for execution on a processor. The method may also comprise tagging the fetch group with a youngest bit location of a circular buffer, the circular buffer implementing a global history vector comprising a plurality of bits. Each of the bits may be associated with a corresponding fetch group. The method may also comprise receiving branch prediction associated with the fetch group, predicted using at least the global history vector. The method may also comprise storing the branch prediction in one or more next entries to the youngest bit location of the circular buffer. The method may also comprise updating the youngest bit location of the circular buffer based on a number of bits inserted in the circular buffer.

An apparatus for tracking global history vector in high performance processors, in one aspect, may comprise a shift register comprising a plurality of bits implementing the global history vector. A shift counter may be associated with the global history vector, the shift counter storing current shift count of the global history vector. A global history vector mechanism may be operable to receive a fetch group comprising a group of instructions for execution on a processor. The global history vector mechanism may be further operable to tag the fetch group with the current shift count of the global history vector. The global history vector mechanism may be further operable to receive branch prediction associated with the fetch group, predicted using at least the global history vector. The global history vector mechanism may be further operable to shift the global history vector by a number of bits to a direction of older bit position. The global history vector mechanism may be further operable to store the branch prediction associated with the fetch group in most recent bit position of the global history vector. The global history vector mechanism may be further operable to update the current shift count of the global history vector based on the number of bits. The global history vector may represent an execution path and each of the plurality of bits may be allocated for a corresponding fetch group.

An apparatus for tracking global history vector in high performance processors, in another aspect, may comprise a circular buffer implementing the global history vector comprising a plurality of bits. Each of the bits may be associated with a corresponding fetch group. A younger pointer hardware component may track a youngest bit location of the circular buffer. An oldest pointer hardware component may track an oldest bit location of the circular buffer. A global history vector mechanism may be operable to receive a fetch group comprising a group of instructions for execution on a processor. The global history vector mechanism may be further operable to tag the fetch group with the youngest bit location of the circular buffer. The global history vector mechanism may be further operable to receive branch prediction associated with the fetch group, predicted using at least the global history vector. The global history vector mechanism may be further operable to store the branch prediction in one or more next entries to the youngest bit location of the circular buffer. The global history vector mechanism may be further operable to update the youngest bit location of the circular buffer based on a number of bits inserted in the circular buffer.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Methods for long global history vector (GHV) tracking and recovery are presented. In one embodiment, a method may implement a shift register with a counter that keeps track of number of shifts to the GHV performed by in-flight fetch groups. A shift-register may be sized such that branch prediction or outcome of all currently in-flight (non-retired) branches is stored. "In-flight" instructions in the present disclosure refer to the instructions entered into an instruction pipeline but not retired. A counter may be employed to determine the amount of bits to shift the shift-register in order to accurately recover the branch history. A mechanism may be provided that comprise logic that recovers the branch history in the case of fetch redirect. This method accurately recovers GHV contents on a flush by differencing the shift counter value stored in the fetch group and the shift counter value located at the GHV.

In another embodiment, a method for accurate long global history vector (GHV) tracking and recovery may implement a circular buffer and employ pointers into the elements of the circular buffer for accurately recovering the GHV. A circular buffer with youngest (most recent) and oldest (least recent) pointers that indicate the current branch history vector may be maintained and a mechanism may be provided that updates the youngest and oldest pointers on prediction and recovery. A mechanism may be also provided that extracts the current branch history vector during branch prediction.

Proposed methods of accurately tracking and recovering GHV result in an order of magnitude reduction in area complexity. The methods may allow for minimal amount of hardware to be used to accurately recover branch history vector when fetch redirect happens. One or more systems and/or apparatuses may be also provided that implement one or more of the above methods.

Briefly, a global history vector (GHV) maintains a history of instruction fetches. Each bit of the global history vector is associated with a group of instructions fetched, e.g., a cache line from an instruction cache. In the present disclosure, a group of instructions fetched and associated with a bit of the global history vector is also referred to as a fetch group. The bits of GHV maintain a recent path of execution. GHV is used in predicting whether a branch would be taken or not taken in an execution path. Generally, prediction methodology may comprise XOR'ing (performing exclusive OR operation) of the GHV bits with the content of an instruction fetch address register (IFAR) to produce an address for branch history tables.

In one aspect, it is also recognized that long history vectors (GHV) may achieve high performance, for example, when using TAGE components. However, maintaining long history vectors in a superscalar processor may need multiple copies of the GHV to be maintained for the multiple fetch groups in flight. For example, this is needed in order to recover the previous GHV state in case of a branch misprediction (misdirection) or other flush conditions. Thus, it is desirable to have a method that reduces the amount of information to maintain for recovery purposes, and at the same time reduces the critical path for making a prediction (e.g., TAGE prediction). Thus, fewer logic gates/levels may be required to complete the desired computation. Reducing the critical path in general increases performance.

Figure 1:
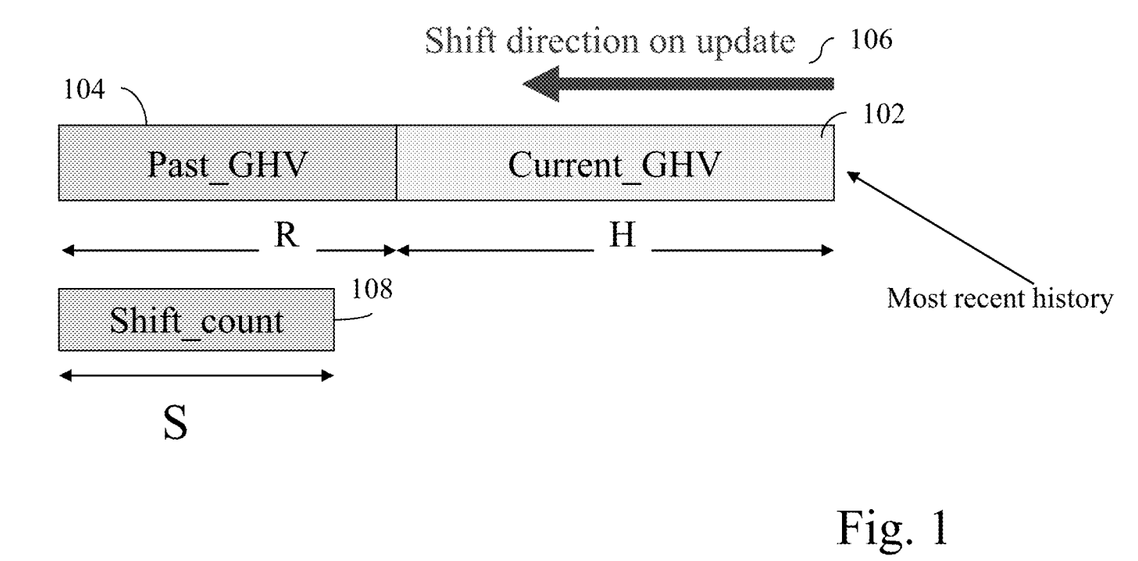
FIG. 1 is a diagram that illustrates a shift register in one embodiment of the present disclosure employed for branch prediction in one embodiment of the present disclosure.

FIG. 1 is a diagram that illustrates a shift register in one embodiment of the present disclosure employed for branch prediction in one embodiment of the present disclosure. In one embodiment of the present disclosure, a shift register may implement a GHV. Each bit is associated with a fetch group. The shift register may comprise H bits allocated for current fetch groups 102 and R bits allocated for past fetch groups 104. The shift register tracks current GHV (denoted as Current_GHV) 102 and past GHV (denoted as Past_GHV) 104 states for a GHV.

After a flush, part of past GHV states replaces current GHV. A new prediction speculatively updates the GHV by shifting bits to the direction of the older fetch group (e.g., in the example in FIG. 1, to left) 106 and then inserting the new prediction. A counter 108 stores a shift count (denoted as Shift_count) value that tracks the number of GHV shifts (total number of GHV shifts). Each fetch group contains the value of Shift_count right before the prediction was done. The counter wraps around when incremented.

Consider that F represents maximum possible fetch groups in flight. Consider also that R represents maximum number of GHV bits corresponding to the F groups in flight. Then, GHV may be restored up until the GHV R fetch groups ago. Total architected GHV (used for prediction) is H, which may depend on a processor and/or a predictor used by the processor in predicting branch instructions. In one embodiment of the present disclosure, total physical GHV size is implemented as H+R. Past_GHV size, R, may be set so that the Current_GHV can be fully restored, for instance, in the case that parameter R is equal to F. Shift_count size, S is set to ceiling[log 2(R+1)]. Past GHV refers to GHV in addition to the H number of bits maintained for unresolved branch instructions.

Figure 2:
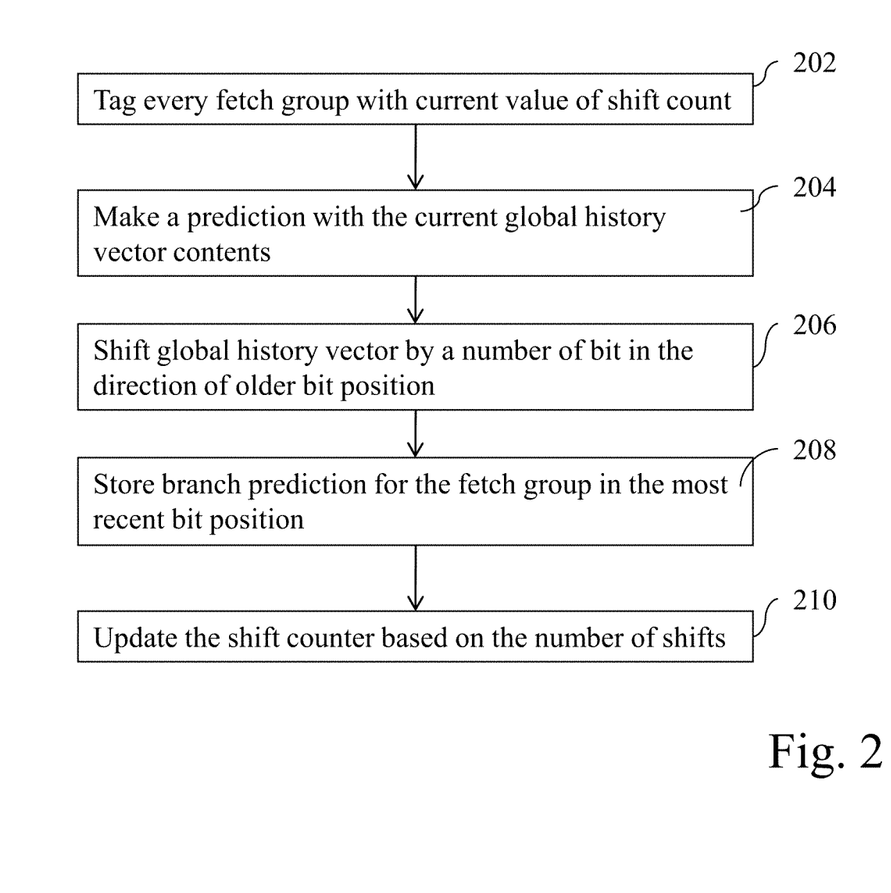
FIG. 2 is a flow diagram that illustrates an algorithm for branch prediction employing a shift register in one embodiment of the present disclosure.

FIG. 2 is a flow diagram that illustrates an algorithm for branch prediction employing a shift register in one embodiment of the present disclosure. The following notations are used with reference to FIG. 2. "FG" refers to fetch group. "EA" refers to effective address of the fetch group. "Predict( . . . )" provides prediction as function of FG's EA and Current_GHV. "i" refers to i-th fetch group fetched. "numBits" refers to number of bits to shift GHV as a function of the FG's EA. "youngest" refers to location of the youngest (most recent) bit in the GHV. "Shift_Count:" refers to number of shifts of the GHV.

At 202, every fetch group gets tagged with current value of Shift_count: FG[i].Shift_count<-GHV.Shift_count. For instance, when a fetch group enters a processing pipeline, the shift count associated with that fetch group is assigned a current shift count of the global history vector, i.e., the previous state of the shift count before a branch prediction related to that fetch group is inserted to the GHV. Unlike the known methods in which each fetch group is tagged with the entire GHV, the algorithm in one embodiment of the present disclosure does not tag each fetch group with the entire GHV. Instead, each fetch group in the present disclosure in one embodiment is tagged with a shift count.

At 204, a prediction is done with the current GHV contents: FG[i].pred<-Predict(FG[i].EA,Current_GHV).

For instance, generally the GHV is exclusive-or'ed (XORed) with the effective address of the fetch group.

At 206, GHV is shifted by a number of bits, numBits, in the direction of the older entry (e.g., left): GHV<-GHV<<numBits. numBits is a function of GHV tracking precision. For example, the GHV is shifted by numBits, in one embodiment of the present disclosure, instead of hard-coded one bit (or another number), to keep the GHV update parameterized for different processor implementations. In one implementation, the shift can be only one bit every prediction. In another implementation, for example that has the ability to predict more than one branch in a cycle, the shift can be by two or more bits.

At 208, branch prediction for the fetch group is stored in the most recent bit position (e.g., the least significant bit) in the GHV: GHV[youngest]<-FG[i].pred.

At 210, the shift counter is updated based on the number of shifts: GHV.Shift_count<-(GHV.Shift_count+numBits) mod($2^S$). The modular function wraps around the counter, e.g., so that a counter overflow does not occur.

Figure 3:
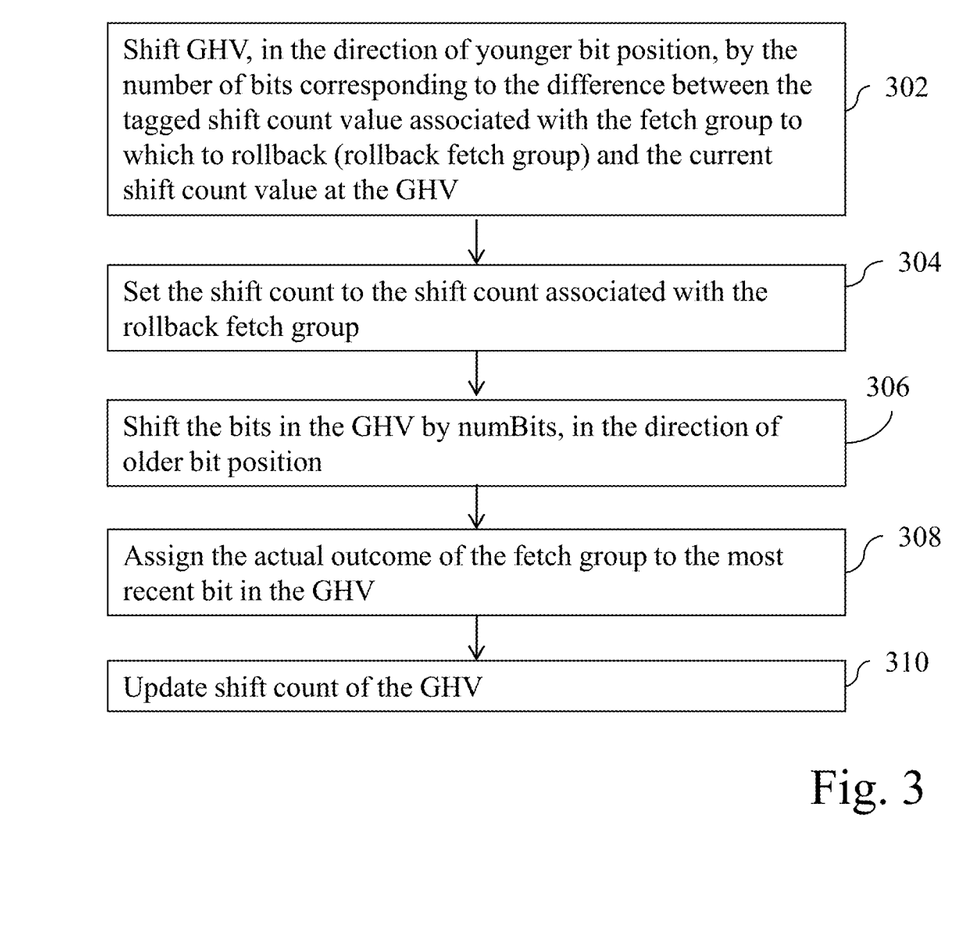
FIG. 3 is a flow diagram that illustrates an algorithm for recovering global history vector employing a shift register in one embodiment of the present disclosure.

FIG. 3 is a flow diagram that illustrates an algorithm for recovering global history vector employing a shift register in one embodiment of the present disclosure. The following notations are used with reference to FIG. 3. "FG" refers to fetch group. "EA" refers to effective address. "numBits" refers to number of bits to shift GHV as a function of the FG's EA. "youngest" refers to location of the youngest (most recent) bit in the GHV. "flushID" refers to or identifies fetch group to rollback to, determined by a processor that performs an appropriate computation to determine GHV bits to restore. "outcome" refers to actual prediction for a fetch group. "Shift_Count" refers to number of shifts of the GHV.

At 302, a global history vector (GHV) is shifted to the direction of the younger bit position (e.g., shifting GHV bits to the right) by the number of bits corresponding to the difference between the tagged shift count value associated with the fetch group to which to rollback (referred to herein as rollback fetch group) and the current shift count value at the GHV: GHV<-GHV>>((GHV.Shift_count-FG[flushID].Shift_count)mod($2^S$)).

At 304, the shift count of the GHV is reset to the shift count associated with the fetch group to which to rollback (e.g., tagged count at 202, FIG. 2, e.g., before the rollback fetch group's prediction was entered in the GHV): GHV.Shift_count<-FG[flushID].Shift_count.

At 306, the bits in the GHV are shifted in the direction of older bit position by numBits: GHV<-GHV<<numBits. The value of numBits is dependent on the predictor and/or a processor performing appropriate prediction/restore methodology. For example, the GHV is shifted by numBits, in one embodiment of the present disclosure, instead of hard-coded one bit or another number, to keep the GHV update parameterized for different processor implementations. In one implementation, the shift can be only one bit every prediction. In another implementation, for example that has the ability to predict more than one branch in a cycle, the shift can be by two or more bits.

At 308, the location of the most recent bit in the GHV is assigned the actual outcome of the fetch group (rollback fetch group). The actual outcome indicates whether a branch was actually taken (e.g., '1') or not take (e.g., '0'): GHV[youngest]<-FG[flushID].outcome.

At 310, the number of shifts of the GHV is updated: GHV.Shift_count<-GHV.Shift_count+numBits. The numBits here may be a function of the fetch group's effective address.

Figure 4:
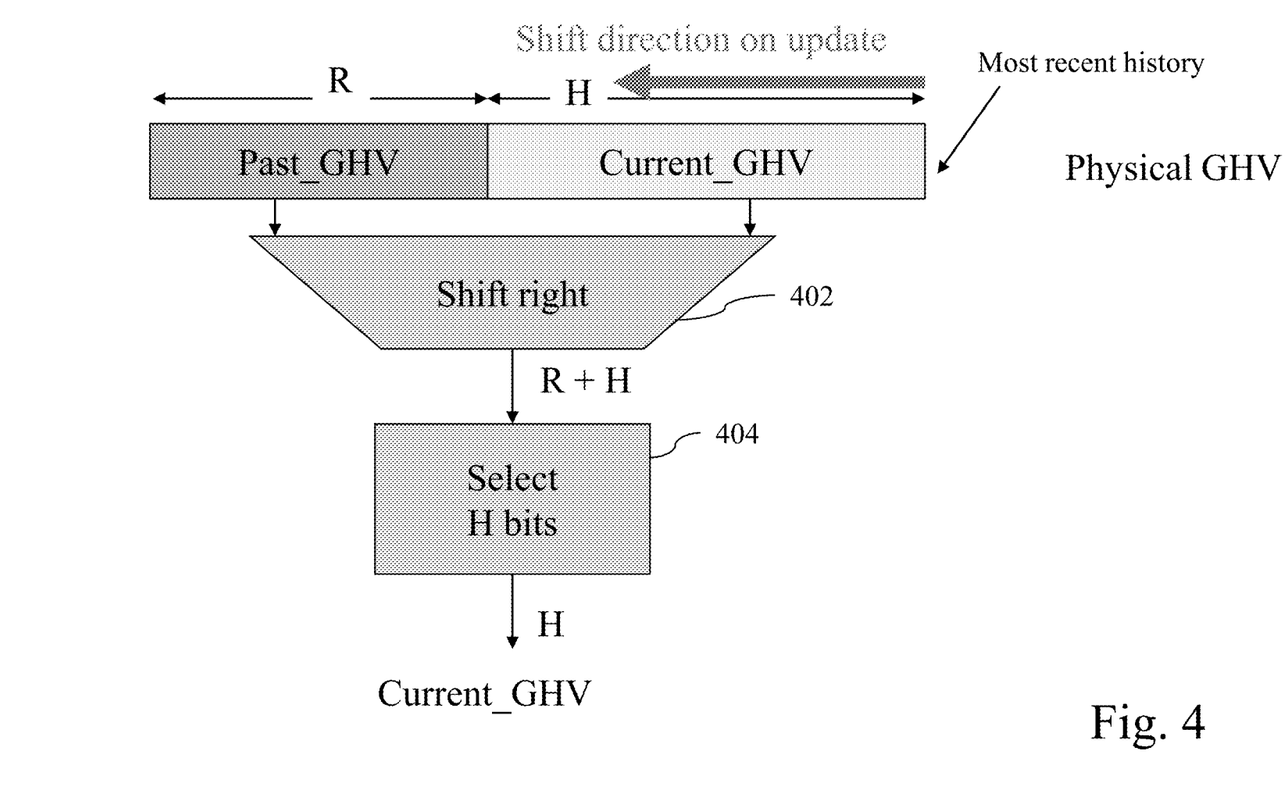
FIG. 4 illustrates recovery with shift register in one embodiment of the present disclosure.

FIG. 4 illustrates recovery with shift register in one embodiment of the present disclosure. For recovery the GHV is shifted in the direction of younger bit by ((GHV.Shift_count-FG[flushID].Shift_count)mod($2^S$)) bits to recover the past GHV bits using a shift register 402. First, the GHV is shifted in the direction of the older bit by H bits. Then, the least significant H bits of the GHV are selected, to accommodate the actual outcome. H is a function of a predictor.

The number of bits tracked with the shift register implementation of the present disclosure may be: R+H+((F+1)*S), where F represents maximum number of fetch groups allowed in the processor, H is the number of current GHV bits, S is the shift count size, and R represents maximum number of GHV bits that can be accurately recovered. R may be less than equal to F.

The shift register method in one aspect tracks S bits per fetch group. In one aspect, the number of bits to track may be a function of F and is dominated by the term (F+1)*S. For example, consider H=128, F=256, R=255. Assuming S is 8, the number of bits to track then equals 255+128+(257*8)=2,439 bits to track.

The components shown in FIG. 4 may be part of a branch prediction logic that comprises a GHV mechanism implemented with a circular buffer, and other components (not shown) used in instruction fetch and processing.

Figure 5:
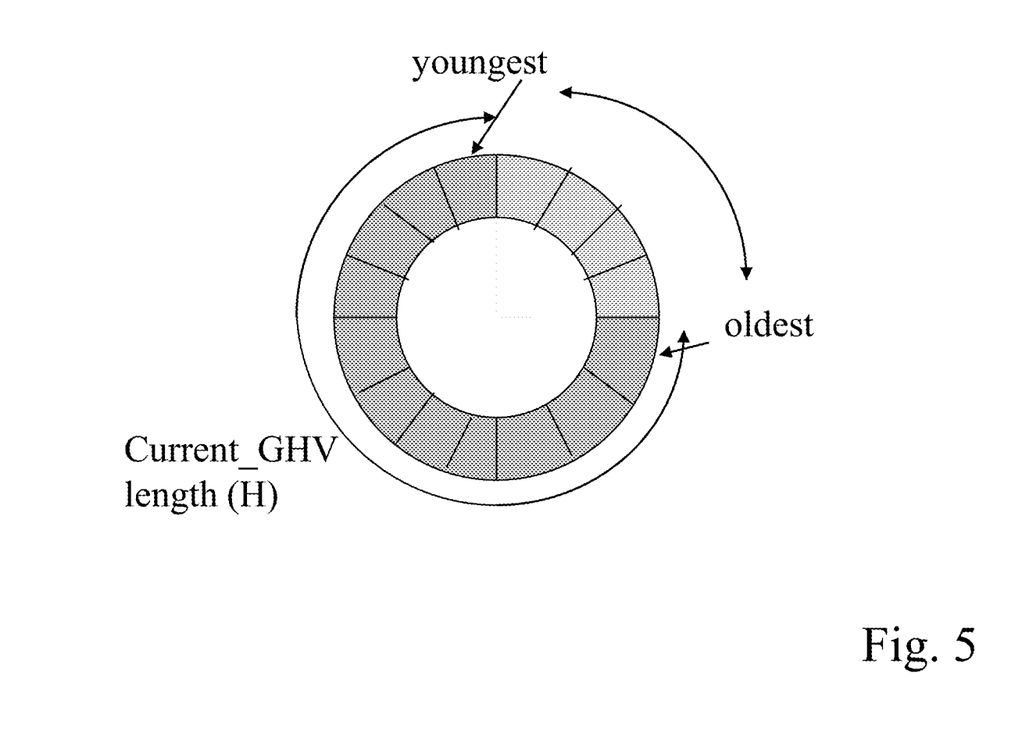
FIG. 5 illustrates a circular buffer employed for branch prediction in one embodiment of the present disclosure.

FIG. 5 illustrates a circular buffer employed for branch prediction in one embodiment of the present disclosure. In one embodiment, a long GHV may be implemented as a circular buffer with floating youngest (most recent) and oldest (least recent) pointer. Each entry is a bit. Youngest pointer points to the most recent bit position. Oldest pointer points to the oldest bit position. H represents the current GHV length (Current_GHV length), which may be a function of a processor or particular predictor. R represents the number of in-flight bits supported for the maximum number of fetch groups. The physical GHV length, n=H+R. (H+R)=$2^i$, for i=0, 1, 2, ..., feature allows the sum of H+R to be a power of 2, allowing for log 2(H+R) bits to track the youngest point. Each pointer may have the size of P bits=log 2(H+R) to be able to uniquely address or point to each bit in the circular buffer. Oldest has the entry position in the circular buffer, Oldest<-(Youngest+H)mod(H+R).

Figure 6:
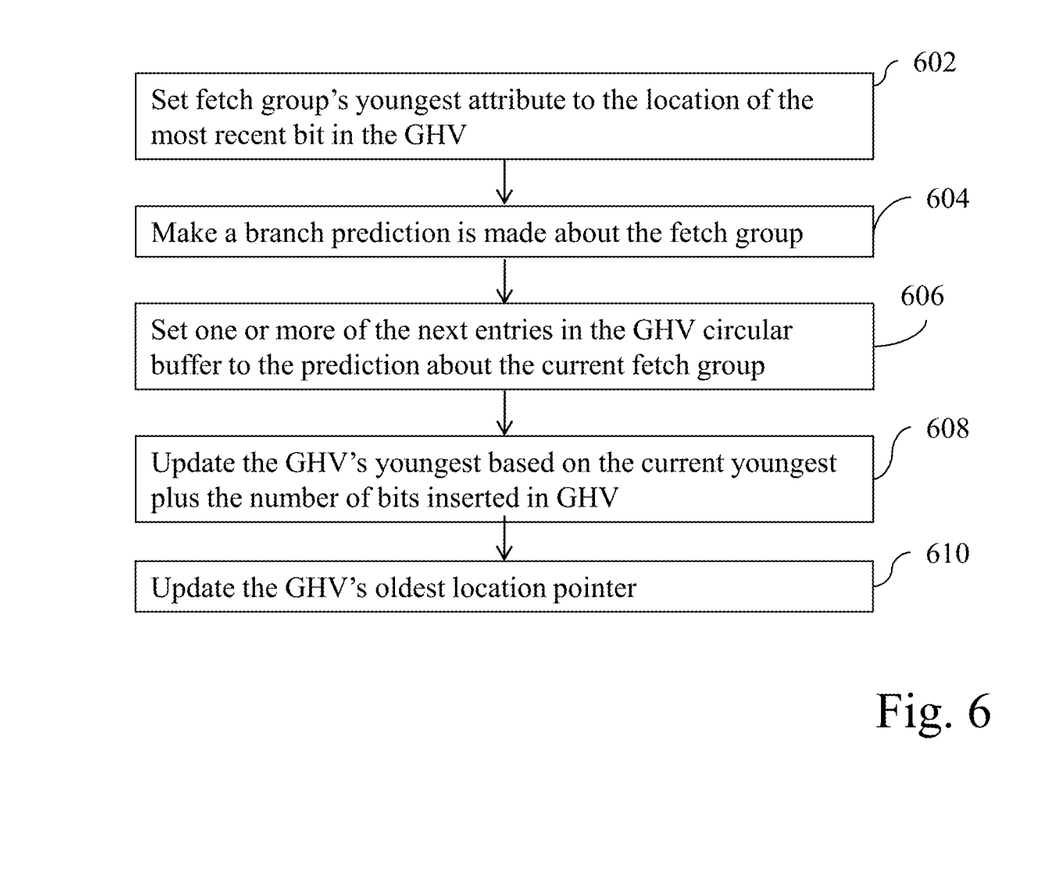
FIG. 6 is a flow diagram that illustrates an algorithm for branch prediction employing a circular buffer in one embodiment of the present disclosure.

FIG. 6 is a flow diagram that illustrates an algorithm for branch prediction employing a circular buffer in one embodiment of the present disclosure. The branch prediction in this embodiment implements a GHV with a circular buffer structure. The following terminology is used with reference to FIG. 6. "FG" refers to Fetch Group. "EA" refers to effective address. "Predict( . . . )" provides prediction as function of FG's EA and current GHV (Current_GHV). "i" refers to i-th fetch group fetched. "numBits" refers to number of bits to shift GHV as a function of the FG's EA. "youngest" refers to location of the youngest (most recent) bit in the GHV.

At 602, a fetch group's youngest attribute is set to the location of the most recent bit in the GHV: FG[i].youngest<-GHV.youngest. For instance, each fetch group has an associated "youngest" attribute, representing the current most recent entry of the circular buffer before the fetch group's branch prediction is inserted in the circular buffer.

At 604, prediction is made about the fetch group: FG[i].pred<-Predict(FG[i].EA,Current_GHV). A predictor, for instance, employs an appropriate prediction mechanism, which may generally involve bit-wise operation (e.g., XOR) on the EA and GHV.

At 606, the next entry in the GHV circular buffer is set to the prediction about the current fetch group: GHV[(GHV.youngest+1)mod(H+R)]<-FG[i].pred. The circular buffer wraps around based on the size of H+R. Multiple entries (bits) may be updated based on implementation.

At 608, the GHV's youngest is updated to the current youngest plus the number of bits inserted in the GHV after performing the prediction: GHV.youngest<-(GHV.youngest+numBits)mod(H+R). The value of numBits is determined according to tracking precision implemented by a predictor or a processor. The youngest pointer is updated by numBits, in one embodiment of the present disclosure, instead of hardcoded one bit (or another hardcoded number), to keep the GHV update parameterized for different processor implementations. In one implementation the youngest pointer can be updated by only one bit every prediction. In another implementation, for example that has the ability to predict more than one branch in a cycle, youngest pointer can be updated by two or more bits.

At 610, the GHV's oldest bit location pointer is updated as oldest<-(youngest+H) mod (H+R). In one embodiment of the present disclosure, oldest and youngest pointers are separated by H bits at the most. H is the number of bits employed for prediction. Specifically, the H bits separating the oldest and the youngest pointers are employed for indexing into the predictor.

Figure 7:
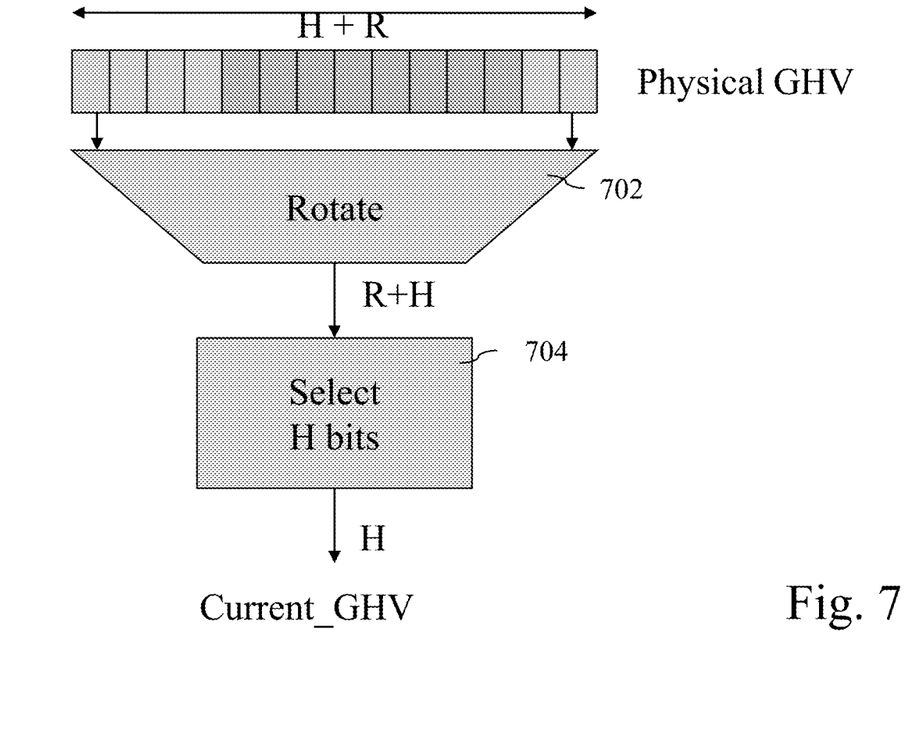
FIG. 7 illustrates prediction with circular buffer in one embodiment of the present disclosure.

FIG. 7 illustrates a circular buffer employed in branch prediction in one embodiment of the present disclosure. Prediction with circular buffer comprises rotate and select on critical path. Rotate 702 aligns all architected GHV bits to the direction of the older bits (e.g., right) as a function of youngest and oldest pointers. Select 704 chooses the H least significant bits from the R+H rotated bits, to accommodate the current prediction.

The components shown in FIG. 7 may be part of a branch prediction logic that comprises a GHV mechanism implemented with a circular buffer, and other components (not shown) used in instruction fetch and processing.

Figure 8:
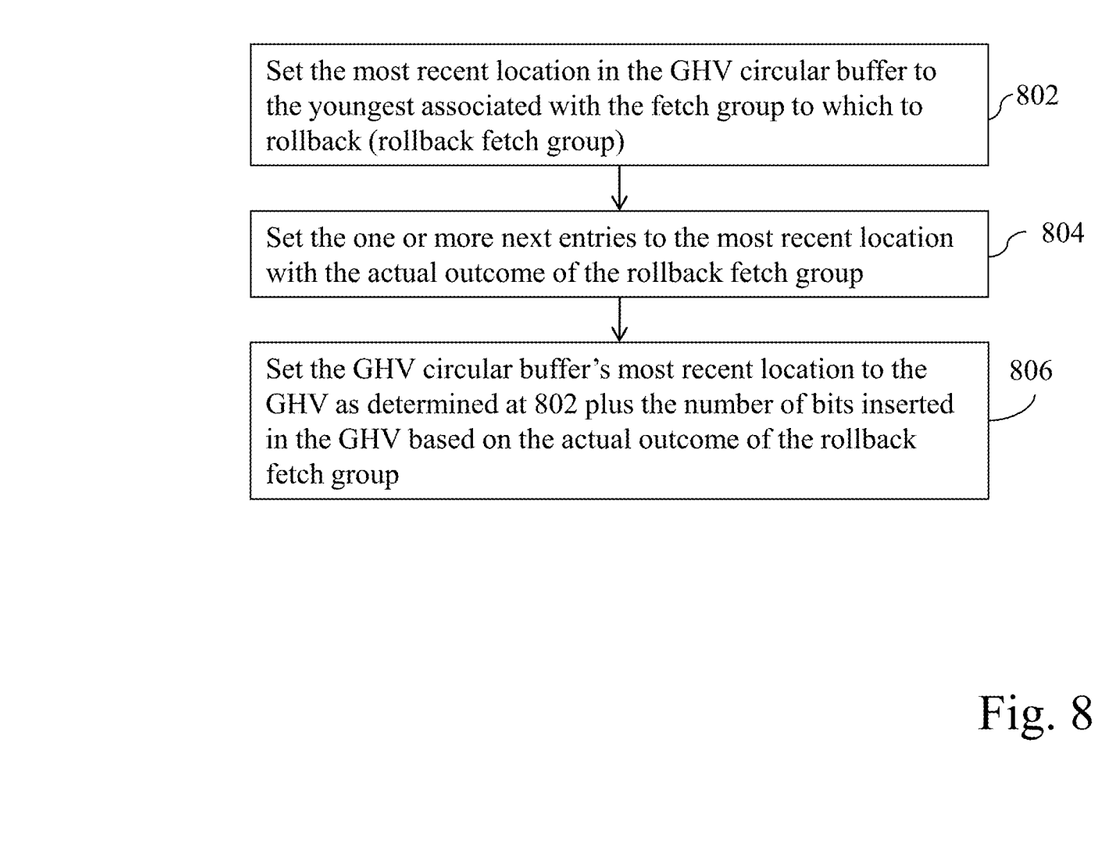
FIG. 8 illustrates an algorithm for global history vector recovery employing circular buffer in one embodiment of the present disclosure.

FIG. 8 illustrates an algorithm for global history vector recovery employing circular buffer in one embodiment of the present disclosure. The following terminology is used with reference to FIG. 8. "FG" refers to fetch group. "numBits" is the number of bits to shift GHV as a function of the FG's EA. "youngest" refers to a location of the youngest (most recent) bit in the GHV. "flushID" identifies the fetch group to rollback to, determined by the processor. "outcome" refers to the actual prediction for a fetch group.

At 802, the most recent location in the GHV circular buffer is set to the youngest associated with the fetch group to which to rollback: GHV.youngest<-FG[flushID].youngest.

At 804, the next entry to the most recent location is set to the actual outcome of the fetch group to which it is being rolled back: GHV[(GHV.youngest+1)mod(H+R)]<-FG[flushID].outcome.

At 806, the most recent location in the GHV circular buffer is set to the most recent location in the GHV as determined at 802 plus the number of bits by which the GHV is being shifted based on the actual outcome of the fetch group: GHV.youngest<-(GHV.youngest+numBits)mod(H+R).

In the case of the circular buffer implementation, the number of bits comprise H+R+(F*log 2(H+R)). The method tracks log 2(H+R) bits per fetch group, which represent the number of bits for tracking "youngest" associated with each fetch group. As a function of H, dominant term H has a multiplicative constant of 1, instead of F. As a function of F, the number to track may be dominated by the term (F*log 2(H+R)). For example, if H=128 and F=256, and R=256, the number of bits to track would be 128+256+(256*9))=2,688 bits. This number presents a reduction by an order of magnitude compared to an existing methodology in which the entire GHV is maintained for each fetch group (H*F+H: 32,896 bits to track) for branch prediction.

Figure 9:
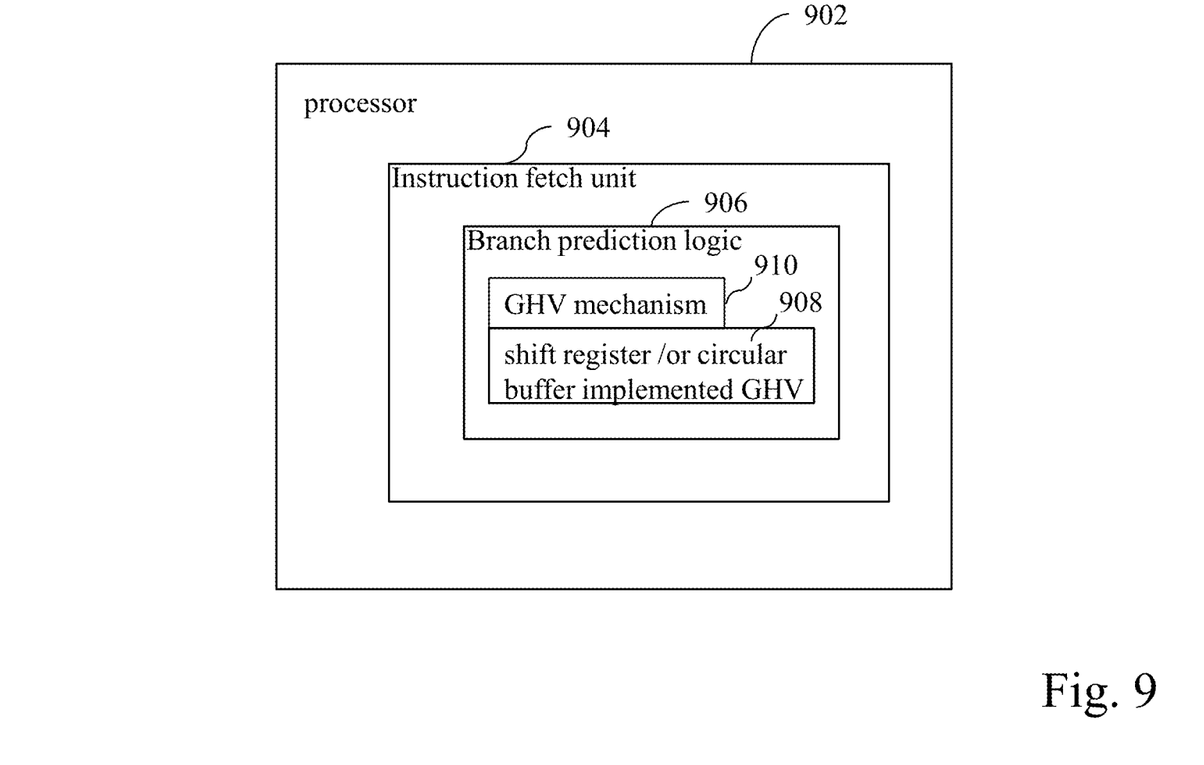
FIG. 9 is a block diagram that shows a GHV mechanism in one embodiment of the present disclosure in context of a processing device.

FIG. 9 is a block diagram that shows a GHV mechanism in one embodiment of the present disclosure as described above. GHV 908 implemented by a shift register or a circular buffer, as described above, may be a part of a branch prediction logic unit 906. The branch prediction logic 906 may comprise GHV mechanism 910 as described above, employing the shift register or circular buffer implemented GHV 908. The branch prediction logic in turn may be part of an instruction fetch unit 904 or the like of a processor, that fetches instructions, e.g., from an instruction cache, for execution. The branch prediction logic 906 in one embodiment may comprise a GHV mechanism of the present disclosure, and comprise a shift register and counter, e.g., as illustrated in FIG. 1, or a circular buffer structure, e.g., as illustrated in FIG. 5. Other components of branch prediction logic 906, a processor 902, and instruction fetch unit 904, e.g., instruction fetch address register, instruction cache, instruction decode unit, floating point and fixed point units, and others components that a processor might use in executing a program of instructions, are not shown.

As will be appreciated by one skilled in the art, aspects of the present invention may be embodied as a system, method or computer program product. Accordingly, aspects of the present invention may take the form of an entirely hardware embodiment, a software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of tracking global history vector in high performance processors, comprising:
    receiving a fetch group comprising a group of instructions for execution on a processor;
    tagging the fetch group with a current shift count of a global history vector comprising a plurality of bits implemented with a shift register without tagging the fetch group with an entire global history vector;
    receiving branch prediction associated with the fetch group predicted using at least the global history vector;
    shifting the global history vector by a number of bits to a direction of older bit position;
    storing the branch prediction associated with the fetch group in most recent bit position of the global history vector;
    updating the current shift count of the global history vector based on the number of bits,
    wherein the global history vector represents an execution path and each of the plurality of bits are allocated for a corresponding fetch group; and
    recovering the global history vector based on the current shift count in an event the branch prediction is misdirected.

2. The method of claim 1, wherein the shift register that implements the global history vector comprises R number of bits corresponding to past global history vector, and H number of bits corresponding to current global history vector.

3. The method of claim 2, wherein the current shift count is maintained in a hardware counter with maximum size of log 2(R+1) bits.

4. The method of claim 1, wherein recovery of the global history vector in the event the branch prediction is misdirected, comprises:
receiving a rollback fetch group, the rollback fetch group representing a fetch group to which to rollback;
receiving an actual outcome of the rollback fetch group;
shifting the global history vector to a direction of younger bit position by a number of bits corresponding to a tagged shift count associated with the rollback fetch group;
setting the current shift count of the global history vector to the tagged shift count associated with the rollback fetch group;
shifting the global history vector to a direction of older bit position by a number of bits determined as a function of effective address of the rollback fetch group;
storing the actual outcome of the rollback fetch group to most recent bit in the global history vector; and
updating the current shift count of the global history vector.

5. The method of claim 4, wherein the updating the current shift count of the global history vector comprises incrementing the current shift count of the global history vector by the number of bits determined as a function of effective address of the rollback fetch group.

6. A method of tracking global history vector in high performance processors, comprising:
receiving a fetch group comprising a group of instructions for execution on a processor;
tagging the fetch group with a youngest bit location of a circular buffer, the circular buffer implementing a global history vector comprising a plurality of bits, each of the bits for associating with a corresponding fetch group;
receiving branch prediction associated with the fetch group, predicted using at least the global history vector;
storing the branch prediction in one or more next entries to the youngest bit location of the circular buffer; and
updating the youngest bit location of the circular buffer based on a number of bits inserted in the circular buffer,
wherein the global history vector represents an execution path, wherein recovery of the global history vector in the event the branch prediction is misdirected, comprises:
receiving a rollback fetch group, the rollback fetch group representing a fetch group to which to rollback;
receiving an actual outcome of the rollback fetch group;
setting the youngest bit location of the circular buffer to a location tag associated with the rollback fetch group;
storing the actual outcome of the rollback fetch group to an entry next to the youngest bit location of the circular buffer; and
setting the youngest bit location of the circular buffer to a location of last entry stored in the storing step.

7. The method of claim 6, wherein the circular buffer that implements the global history vector comprises H number of bits corresponding to current global history vector and R number of in-flight bits supported for H number of fetch groups.

8. The method of claim 7, wherein a hardware location pointer with maximum size log 2(H+R) tracks a pointer corresponding to the youngest bit location.

9. The method of claim 7, wherein the youngest bit location of the circular buffer is updated as the youngest bit location plus a number of bits inserted in the circular buffer as a result of the storing modulus H plus R.

10. An apparatus for tracking global history vector in high performance processors, comprising:
a shift register comprising a plurality of bits implementing the global history vector;
a shift counter associated with the global history vector, the shift counter storing current shift count of the global history vector; and
a global history vector mechanism operable to receive a fetch group comprising a group of instructions for execution on a processor,
the global history vector mechanism further operable to tag the fetch group with the current shift count of the global history vector,
the global history vector mechanism further operable to receive branch prediction associated with the fetch group, predicted using at least the global history vector;
the global history vector mechanism further operable to shift the global history vector by a number of bits to a direction of older bit position,
the global history vector mechanism further operable to store the branch prediction associated with the fetch group in most recent bit position of the global history vector,
the global history vector mechanism further operable to update the current shift count of the global history vector based on the number of bits,
wherein the global history vector represents an execution path and each of the plurality of bits are allocated for a corresponding fetch group, wherein in the event the branch prediction is misdirected, the global history vector mechanism recovers the global history vector by:
receiving a rollback fetch group, the rollback fetch group representing a fetch group to which to rollback;
receiving an actual outcome of the rollback fetch group;
shifting the global history vector to a direction of younger bit position by a number of bits corresponding to a tagged shift count associated with the rollback fetch group;
setting the current shift count of the global history vector to the tagged shift count associated with the rollback fetch group;
shifting the global history vector to a direction of older bit position by a number of bits determined as a function of effective address of the rollback fetch group;
storing the actual outcome of the rollback fetch group to most recent bit in the global history vector; and
updating the current shift count of the global history vector.

11. The apparatus of claim 10, wherein the shift register that implements the global history vector comprises R number of bits corresponding to past global history vector, and H number of bits corresponding to current global history vector.

12. The apparatus of claim 11, wherein the shift counter has maximum size of log 2(R+1) bits.

13. The apparatus of claim 10, wherein the global history vector mechanism further operable to update the current shift count of the global history vector by incrementing the current shift count of the global history vector by the number of bits determined as a function of effective address of the rollback fetch group.

14. An apparatus for tracking global history vector in high performance processors, comprising:
a circular buffer implementing the global history vector comprising a plurality of bits, each of the bits for associating with a corresponding fetch group;

a younger pointer hardware component tracking a youngest bit location of the circular buffer:

an oldest pointer hardware component tracking an oldest bit location of the circular buffer; and a global history vector mechanism operable to receive a fetch group comprising a group of instructions for execution on a processor, the global history vector mechanism further operable to tag the fetch group with the youngest bit location of the circular buffer, the global history vector mechanism further operable to receive branch prediction associated with the fetch group, predicted using at least the global history vector, the global history vector mechanism further operable to store the branch prediction in one or more next entries to the youngest bit location of the circular buffer, and the global history vector mechanism further operable to update the youngest bit location of the circular buffer based on a number of bits inserted in the circular buffer, wherein the global history vector represents an execution path, wherein the global history vector mechanism is further operable to recover the global history vector in an event the branch prediction is misdirected, by at least:

receiving a rollback fetch group, the rollback fetch group representing a fetch group to which to rollback;

receiving an actual outcome of the rollback fetch group;

setting the youngest bit location of the circular buffer to a location tag associated with the rollback fetch group;

storing the actual outcome of the rollback fetch group to an entry next to the youngest bit location of the circular buffer; and setting the youngest bit location of the circular buffer to a location of last entry stored.

15. The apparatus of claim 14, wherein the circular buffer that implements the global history vector comprises H number of bits corresponding to current global history vector and R number of in-flight bits supported for H number of fetch groups.

16. The apparatus of claim 15, wherein a hardware location pointer with maximum size log 2(H+R) tracks a pointer corresponding to the youngest bit location.

17. The apparatus of claim 15, wherein the youngest bit location of the circular buffer is updated as the youngest bit location plus a number of bits inserted in the circular buffer as a result of the storing modulus H plus R.

* * * * *